(12) United States Patent
Richards et al.

(10) Patent No.: US 7,590,660 B1
(45) Date of Patent: Sep. 15, 2009

(54) METHOD AND SYSTEM FOR EFFICIENT DATABASE CLONING

(75) Inventors: Alvin J. Richards, Chapel Hill, NC (US); William E. Taylor, Bahama, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 281 days.

(21) Appl. No.: 11/387,040

(22) Filed: Mar. 21, 2006

(51) Int. Cl.
*G06F 17/00* (2006.01)

(52) U.S. Cl. ............... 707/104.1; 707/101; 707/102; 707/103 R

(58) Field of Classification Search ...... 707/100–104.1, 707/200–206, 1–10
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |
| RE34,100 E | 10/1992 | Hartness |
| 5,155,835 A | 10/1992 | Belsan |
| 5,163,131 A | 11/1992 | Row et al. |
| 5,355,453 A | 10/1994 | Row et al. |
| 5,426,747 A | 6/1995 | Weinreb et al. |
| 5,485,579 A | 1/1996 | Hitz et al. |
| 5,511,177 A | 4/1996 | Kagimasa et al. |
| 5,581,724 A | 12/1996 | Belsan et al. |
| 5,764,972 A | 6/1998 | Crouse et al. |
| 5,802,366 A | 9/1998 | Row et al. |
| 5,819,292 A | 10/1998 | Hitz et al. |
| 5,828,876 A | 10/1998 | Fish et al. |
| 5,870,734 A | 2/1999 | Kao |

(Continued)

FOREIGN PATENT DOCUMENTS

WO    WO 89/10594    11/1989

(Continued)

OTHER PUBLICATIONS

Miroslav Klivansky, Network Appliance Inc., A Thorough Introduction to FlexClone™ Volumes, Oct. 2004, pp. 1-35.

(Continued)

*Primary Examiner*—Isaac M Woo
(74) *Attorney, Agent, or Firm*—Blakely, Sokoloff, Taylor & Zafman LLP

(57) ABSTRACT

A cloned database is created in the form of a writeable point-in-time image (WPPI) of the source database. After the cloned database is created, either the source database or the cloned database is modified so that both databases may be online simultaneously in a same domain.

23 Claims, 4 Drawing Sheets

U.S. PATENT DOCUMENTS

| | | | |
|---|---|---|---|
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,065,037 | A | 5/2000 | Hitz et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,275,898 | B1 | 8/2001 | DeKoning |
| 6,311,193 | B1 | 10/2001 | Sekido |
| 6,341,341 | B1 | 1/2002 | Grummon et al. |
| 6,425,035 | B2 | 7/2002 | Hoese et al. |
| 6,526,478 | B1 | 2/2003 | Kirby |
| 6,606,690 | B2 | 8/2003 | Padovano |
| 6,618,798 | B1 | 9/2003 | Burton et al. |
| 6,636,879 | B1 | 10/2003 | Doucette et al. |
| 6,721,764 | B2 | 4/2004 | Hitz et al. |
| 6,868,417 | B2 | 3/2005 | Kazar et al. |
| 7,035,881 | B2 | 4/2006 | Tummala et al. |
| 7,085,785 | B2 | 8/2006 | Sawdon et al. |
| 7,263,537 | B1 * | 8/2007 | Lin et al. .................... 707/204 |
| 7,389,313 | B1 * | 6/2008 | Hsieh et al. ................. 707/204 |
| 2002/0083037 | A1 | 6/2002 | Lewis et al. |
| 2002/0112022 | A1 | 8/2002 | Kazar et al. |
| 2002/0116593 | A1 | 8/2002 | Kazar et al. |
| 2003/0158834 | A1 | 8/2003 | Sawdon et al. |
| 2003/0212789 | A1 * | 11/2003 | Hamel et al. ................. 709/225 |
| 2004/0030668 | A1 | 2/2004 | Pawlowski et al. |
| 2005/0246397 | A1 | 11/2005 | Edwards et al. |

FOREIGN PATENT DOCUMENTS

| | | |
|---|---|---|
| WO | WO 02/065275 A1 | 8/2002 |
| WO | WO 03/105026 A1 | 12/2003 |
| WO | WO 2004/015521 A3 | 2/2004 |

OTHER PUBLICATIONS

U.S. Appl. No. 10/836,090, filed Apr. 30, 2004, John K. Edwards.
U.S. Appl. No. 10/836,817, filed Apr. 30, 2004, Edwards et al.
International Search Report for PCT/US2005/013696, Apr. 7, 2006.
Zayas, Edward R., *AFS-3 Programmer's Reference: Architectural Overview*, Transarc Corporation, Pittsburgh, PA, 1.0 edition 1991.
Administration Guide found at http://www.openafs.org/pages/doc/AdminGuide/auagd010.htm, visited on Mar. 2, 2005.
Bitton, Dina, *Disk Shadowing*, Proceedings of the 14$^{th}$ VLDB Conference, Los Angeles, CA (1988).
Blasgen, M.W. et al., *System R: An architectural Overview*, Reprinted from IBM Systems Journal vol. 20, No. 1, 1981 © 1981, 1999.
Chutani, Sailesh, et al., *The Episode file system*, In Proceedings of the USENIX Winter 1992.
Hitz, Dave et al., *File System Design for an NFS File Server Appliance*, Technical Report 3002, Rev. C395, presented Jan. 19, 1994.
Rosenblum, Mendel, et al., *The Design and Implementation of a Log-Structured File System*, In Proceedings of ACM Transactions on Computer Systems, (10)1:26-52, Feb. 1992.

* cited by examiner

METHOD AND SYSTEM FOR EFFICIENT DATABASE CLONING

FIELD OF THE INVENTION

At least one embodiment of the present invention pertains to storage systems, and more particularly, to a technique that enables time and space efficient cloning of a database system.

BACKGROUND

A database administrator will often be asked to create clones of databases for development, testing, QA, user acceptance testing, training or other purposes. Traditionally, a clone of a database is created by duplicating the database. However, there are two related issues with the traditional way of creating a database clone.

First, each clone requires additional physical storage. For example, if the source database which is to be cloned, is 1 TB in size, then after a clone is created, 2 TB of storage is needed to hold the source and the cloned databases.

Second, the time and resources taken (i.e., CPU, Network, I/O, etc.) to physically copy a database can be prohibitive. Often, the process has to be performed outside peak working hours.

Thus, a time and space efficient way of cloning a database is needed.

SUMMARY OF THE INVENTION

The present invention includes a method and system of efficiently creating a clone of a first database maintained in a file system of a storage server. The method comprises putting the first database into a quiesced state, creating a second database in the form of a writeable persistent point-in-time image of the first database, and modifying the first database or the second database so that the first and second databases have different identifiers.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
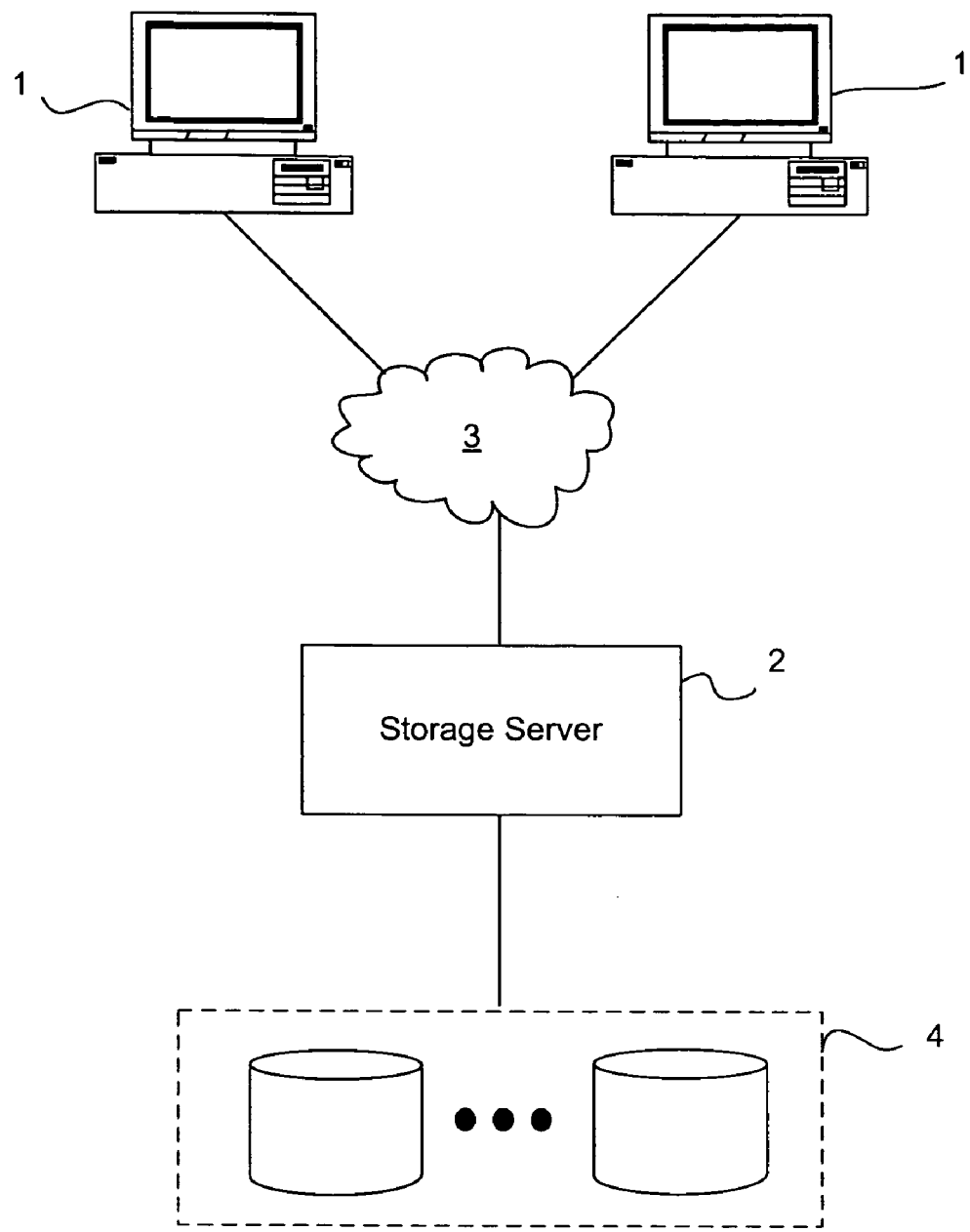
FIG. 1 illustrates a network environment in which the present invention may be implemented.

A method and system for efficiently cloning a database are described.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention includes a technique that enables efficient cloning of a database. According to the technique, a clone of a database is created in the form of a writeable persistent point-in-time image (WPPI) of the database. As for a dataset in a write out-of-place file system, creating a WPPI of the dataset is faster and requires much less storage space than literally duplicating the dataset. As a result, the present invention provides a method and system for time and space efficient database cloning.

Organizations often maintain their databases on various forms of network-based storage systems. These forms include network attached storage (NAS), storage area networks (SANs), and others. A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

A storage server may maintain one or more file systems. A file system may be a write-out-of-place system or a write-in-place system. In a write-out-of-place file system, whenever a data block is modified, it is written to a new physical location on disk. This is in contrast with a write-in-place approach, where a data block, when modified, is written in its modified form back to the same physical location on disk. An example of file system software that implements write-out-of-place functionality is the WAFL® file system software included in the Data ONTAP® storage operating system of NetApp.

One feature which is useful to have in a storage server is the ability to create a read-only persistent point-in-time image (RPPI) of a data set, such as a volume or a LUN, including its metadata. This capability allows the exact state of the dataset to be restored from the RPPI in the event of, for example, data corruption or accidental data deletion. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™ or SnapManager® for Microsoft® Exchange software, both made by NetApp. Unlike other RPPI implementations, NetApp Snapshots do not require duplication of data blocks in the active file system, because a Snapshot can include pointers to data blocks in the active file system.

Another feature which is useful to have in a file system is the ability to create a writable persistent point-in-time image (WPPI) of a data set. One of the differences between an RPPI and a WPPI of a dataset is that the RPPI is only a readable copy of the dataset, whereas the WPPI is a writeable copy of the dataset. An example of an implementation of a WPPI is NetApp's FlexClone™ technology, which, similar to Snapshot, does not require duplication of data blocks in the active file system, but includes pointers to data blocks of the active file system or a subset thereof. This capability allows efficient and substantially instantaneous creation of a clone that is a writable copy of a file system or a subset thereof.

An example of an RPPI technique which does not require duplication of data blocks to create an RPPI is described in U.S. Pat. No. 5,819,292, which is incorporated herein by reference, and which is assigned to NetApp. An example of a WPPI technique which does not require duplication of data blocks to create a WPPI is described in U.S. Patent Application Pub. No. US 2005/0246397, which is also incorporated herein by reference, and which is also assigned to NetApp.

FIG. 1 shows an example of a network environment in which the present invention may be implemented. A storage server 2 is coupled locally to a storage subsystem 4, which includes multiple mass storage devices (e.g., disks). The storage server 2 is also coupled through a network 3 to a number of storage clients 1 (hereinafter simply "clients"). The storage subsystem 4 is managed by the storage server 2. The storage server 2 receives and responds to various read and write requests from the clients 1, relating to volumes, LUNs, files, and/or other units of data stored in (or to be stored in) the storage subsystem 4.

Each of the clients 1 may be, for example, a conventional personal computer (PC), server-class computer, workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol (FCP), or another protocol or a combination of protocols.

The storage subsystem 4 may store data represented in an active file system of the storage server 2, one or more RPPIs, and one or more WPPIs. The "active" file system is the current working file system, where data may be modified or deleted, as opposed to an RPPI, which is a read-only copy of the file system saved at a specific time, or as opposed to a WPPI, which is a writable copy of the file system saved at a specific time. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

Figure 2:
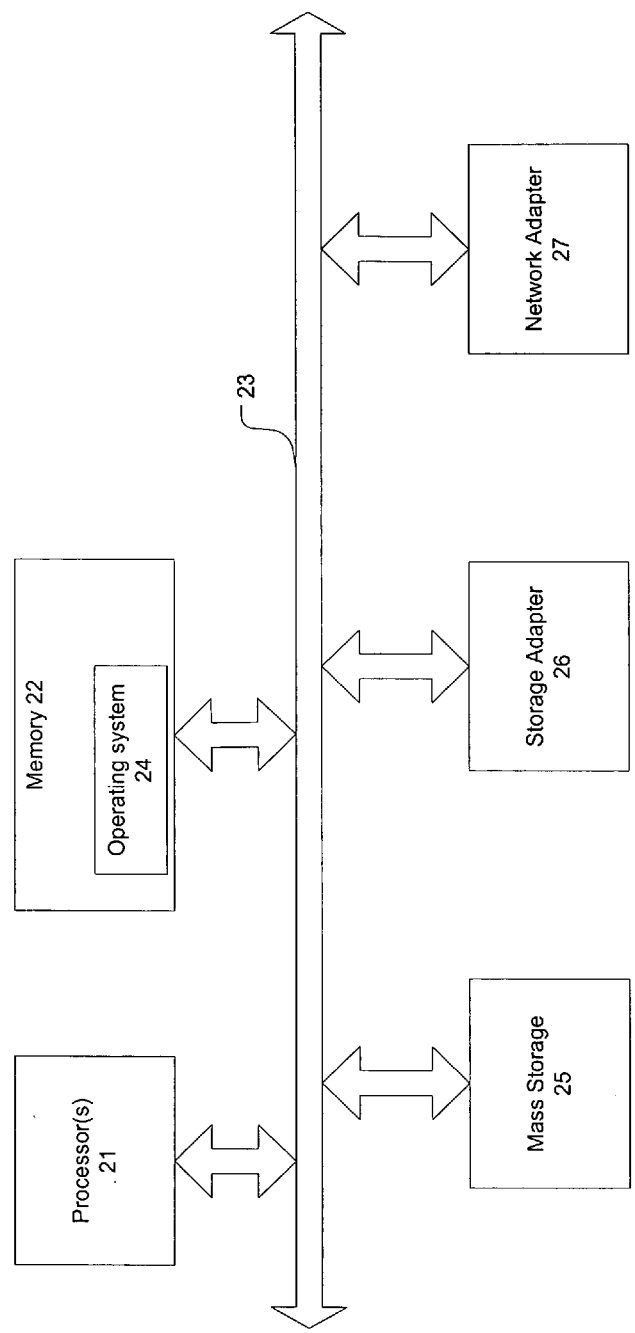
FIG. 2 is a high-level block diagram of a storage server.

FIG. 2 is a high-level block diagram of the storage server, on which the present invention may be implemented. Certain standard and well-known components which are not germane to the present invention are not shown. The storage server 2 includes one or more processors 21 coupled to a bus system 23.

The bus system 23 in FIG. 6 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 23. The memory 22 represents any form of random access memory (RAM), read-only memory (ROM), flash memory, or a combination thereof. Memory 22 stores, among other things, the operating system 24 of the storage server 2, in which the processes discussed above can be implemented.

Also connected to the processors 21 through the bus system 23 are a mass storage device 25, a storage adapter 26, and a network adapter 27. Mass storage device 25 may be or include any conventional medium for storing large quantities of data in a non-volatile manner, such as one or more disks. The storage adapter 26 allows the storage server 2 to access the storage subsystem 4 which maintains the file system(s) and may be, for example, a Fibre Channel adapter or a SCSI adapter. The network adapter 27 provides the storage server 2 with the ability to communicate with remote devices such as the clients 1 over a network and may be, for example, an Ethernet adapter or a Fibre Channel adapter.

Memory 22 and mass storage device 25 store software instructions and/or data, which may include instructions and/or data used to implement the techniques introduced here. These instructions and/or data may be implemented as part of the operating system 24 of the storage server 2.

Figure 3:
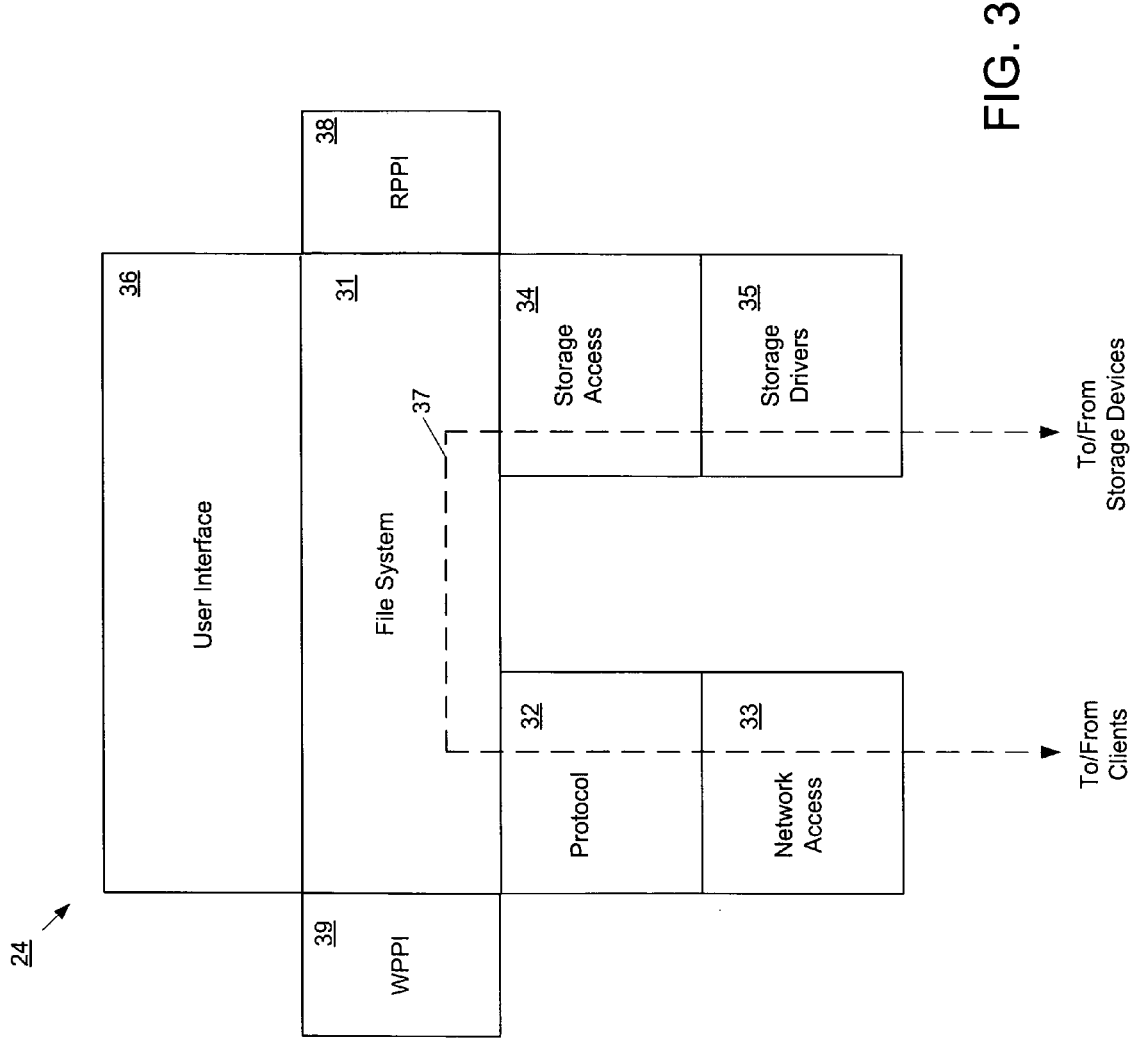
FIG. 3 illustrates the operating system of a storage server.

FIG. 3 illustrates the operating system 24 of the storage server 2. The operating system 24 can include several modules, or layers. These layers include a file system layer 31. The file system layer 31 is an application-level programmatic entity which imposes a structure (e.g. hierarchical) on volumes, files, directories and/or other data containers stored and/or managed by a storage server 2, and which services read/write requests from clients of the storage server. An example of a file system layer which has this functionality is the WAFL file system software that is part of the Data ONTAP storage operating system from NetApp.

Logically under the file system layer 31, the operating system 24 also includes a network layer 32 and an associated network media access layer 33, to allow the storage server 2 to communicate over a network (e.g., with clients 1). The network 32 layer implements various protocols, such as NFS, CIFS, HTTP, SNMP, and TCP/IP. The network media access layer 33 includes one or more drivers which implement one or more protocols to communicate over the interconnect 3, such as Ethernet or Fibre Channel. Also logically under the file system layer 31, the operating system 24 includes a storage access layer 34 and an associated storage driver layer 35, to allow the storage server 2 to communicate with the storage subsystem 4. The storage access layer 34 implements a storage redundancy protocol, such as RAID-4 or RAID-5, while the storage driver layer 35 implements a lower-level storage device access protocol, such as Fibre Channel or SCSI. Reference numeral 37 in FIG. 3 shows the data access path through the operating system 24, associated with servicing read and write requests from clients.

The operating system 24 may also include an RPPI layer 38, which interfaces with the file system layer 31 and external RPPI client software, to allow creation of RPPIs and restoration of data from RPPIs. In addition, the operating system 24 may include a WPPI layer 39, which interfaces with the file system layer 31 and external WPPI client software, to allow creation of WPPIs. The operating system 24 may further include a user interface layer 36, which implements a graphical user interface (GUI) and/or a command line interface (CLI), for example, such as for purposes of administrative access to the storage server 2.

Figure 4:
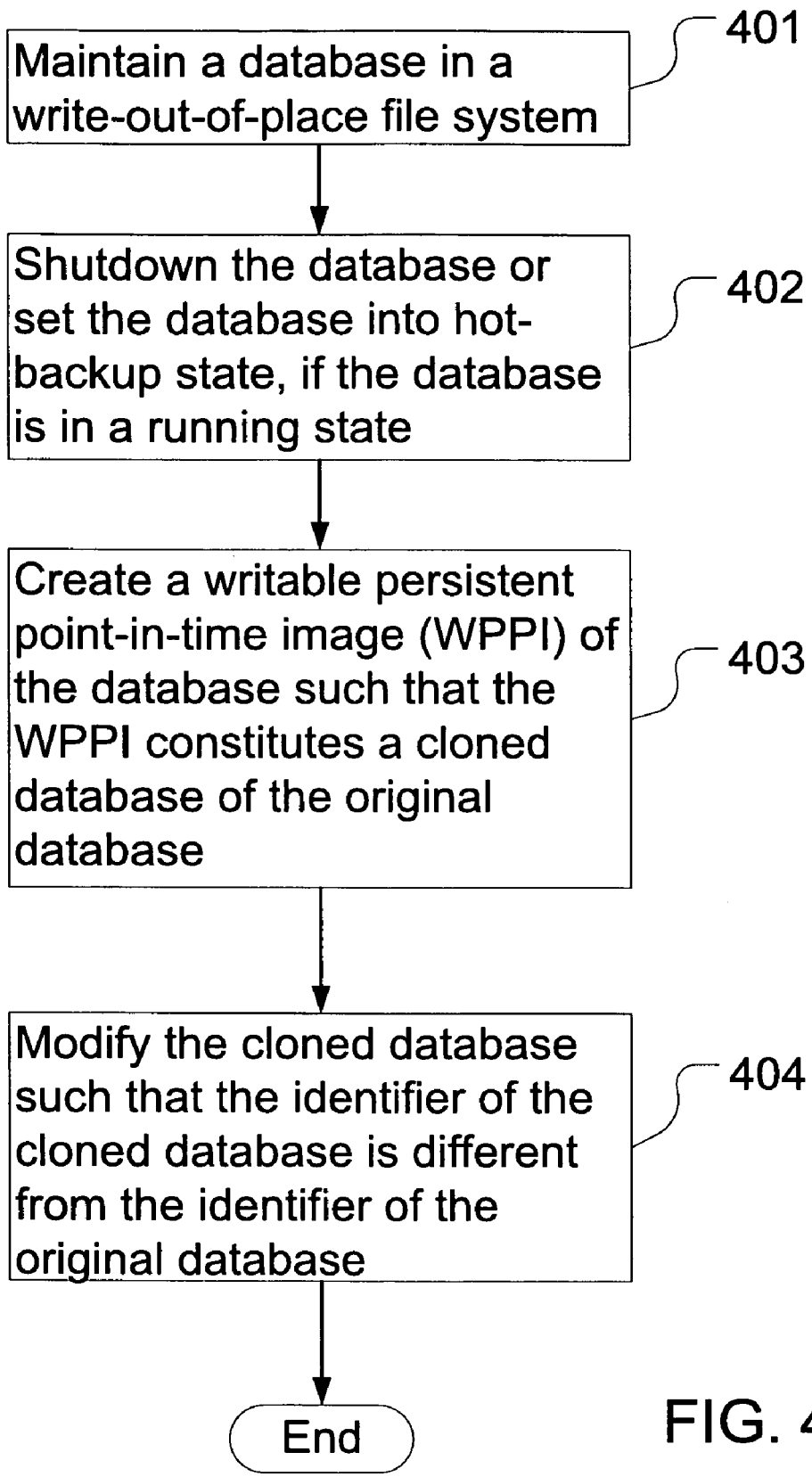
FIG. 4 is a flow diagram illustrating a process of cloning a database according to an embodiment of the present invention.

FIG. 4 is a flow diagram illustrating a process of cloning a database according to an embodiment of the present invention. As described in block 401, it is assumed that the database that is to be cloned is maintained in a write-out-of-place file system. The database mentioned here may be any kind of database, i.e., a flat file, a relational database, a distributed database, etc. For example, a typical relational database may be an Oracle™ database. At block 402, if the database is running (or "online"), the process sets the database into a quiesced state (such as a "hot-backup" state or "offline" state). Here, the term "running" or "online" means that the database is accessible by users and/or other programs such that new data may be input into the database or data stored in the database may be retrieved, modified or deleted. The term "offline" means that the database is not accessible by users or other programs. The term "hot-backup" means that the database is still accessible or available for transactions, but is put into a mode in which the data can be safely copied because crash consistency is provided to guarantee the database system's data integrity. At block 403, a writeable persistent-point-in-time image (WPPI) of the database is created. This step can be done by using, for example, technique described in U.S. Patent Application Pub. No. US 2005/0246397. Because the WPPI is a duplicate of the database, it comprises a second database. For the purpose of illustration, the WPPI of the source database is called "the cloned database" hereinafter. A database is usually configured to have an identifier which uniquely identifies the database within a domain, i.e., a database name space. It is commonly known that two databases with the same identifiers cannot be running simultaneously within the same domain. Thus, in accordance with the technique introduced here, the cloned database's identifier is modified such that the source database and the cloned database have different identifiers, at block 404 utilizing WPPI. Alternatively, the source database's identifier may be modified to differentiate it from the cloned database's identifier. Since the cloned database and the source database have different identifiers, they can be running or online simultaneously within the same domain.

Please note that different database management systems have different domain (or name space) rules. For example, a domain (or a name space) in Oracle is called a "Host", while for other databases it is called a "Database Server".

Back to FIG. 1 which illustrates a network environment in which the present invention may be implemented. A client 1 may be configured as a Database Server (or Host). The source database may be stored on the storage subsystem 4 of the storage server 2. The cloned database of the source database may be created and stored on the same storage subsystem 4 or on a storage subsystem of a different storage server which is also connected with the Database Server (or Host).

Thus, a method and apparatus for efficiently cloning a database have been described. The present invention allows efficient cloning of a database by using the WPPI technique implemented in a write-out-of-place file system. As described above, creating a WPPI of a dataset in a write-out-of-place file system does not require duplication of data blocks of the dataset, but includes pointers to data blocks of the dataset. This capability allows substantially instantaneous creation of a clone of a database, and very small extra storage space is required for storing the clone.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   maintaining, by a storage server, a first database in a file system of the storage server, wherein maintaining the first database includes storing and managing data on behalf of a client processing system;
   putting the first database into a quiesced state;
   creating a second database in the form of a writeable persistent point-in-time image (WPPI) of the first database, wherein the WPPI includes a reference to at least part of the first database but does not duplicate said part of the first database when the WPPI is created;
   modifying the first database or the second database such that the first database and second database are capable of being online simultaneously within a same domain; and
   storing the first database and the second database within the same domain.

2. The method of claim 1, wherein said quiesced state comprises an offline state.

3. The method of claim 1, wherein said quiesced state comprises a hot-backup state.

4. The method of claim 1, wherein the WPPI is a copy of a set of pointers to data blocks of the first database at a point in time.

5. The method of claim 4, wherein said file system comprises a write out-of-place file system.

6. The method of claim 1, wherein each of the first and second databases includes an identifier which uniquely identifies the corresponding database, wherein said modifying the first database or the second database comprises
   changing the identifier of the first database or the second database such that the identifier of the first database is different from the identifier of the second database.

7. The method of claim 1, wherein the file system comprises a volume.

8. The method of claim 1, wherein the domain comprises a database name space.

9. The method of claim 8, wherein the database name space is defined as a Host or a Database Server.

10. The method of claim 1, where the storage server stores the first database and the second database within the same domain.

11. A method of cloning a first database in a write out-of-place files system of a storage server, the first database having an identifier uniquely identifying the first database, the method comprising:
   putting, by a storage server, the first database offline or into a hot-backup state, if the first database is running;
   creating a writeable persistent point-in-time image (WPPI) of the first database such that the WPPI of the first database constitutes a second database having an identifier identical to the identifier of the first database, wherein the WPPI includes a reference to at least part of the first database but does not duplicate said part of the first database when the WPPI is created;
   modifying the identifier of the first database or the second database such that the identifier of the first database is different from the identifier of the second database; and
   storing the first database and the second database within the same domain.

12. The method of claim 11, wherein said creating a writeable persistent point-in-time image (WPPI) of the first database comprises:
   creating a read-only persistent point-in-time image (RPPI) of the first database; and
   creating a WPPI of the first database based on the RPPI.

13. The method of claim 11, wherein the WPPI is a copy of a set of pointers to data blocks of the first database at a point in time.

14. The method of claim 11, wherein the write out-of-place file system comprises a volume.

15. A machine-readable storage medium having sequences of instructions stored therein which, when executed by a processor, cause the processor to perform a process comprising:
   setting a first database into an offline state or hot-backup state, wherein the first database is maintained in a file system of a storage server, wherein the first database has an identifier uniquely identifying the first database;
   creating a writeable persistent point-in-time image (WPPI) of the first database, wherein the WPPI includes a reference to at least part of the first database but does not duplicate said part of the first database when the WPPI is created;
   modifying the WPPI such that the WPPI comprises a second database having an identifier different from the identifier of the first database; and
   storing the first database and the second database within the same domain.

16. The machine-readable storage medium of claim 15, wherein the WPPI is a copy of a set of pointers to data blocks of the first database at a point in time.

17. The machine-readable storage medium of claim 16, wherein said file system comprises a write out-of-place file system.

18. The machine-readable storage medium of claim 17, wherein the write out-of-place file system comprises a volume.

19. A processing system comprising:
   a processor;
   a memory coupled to the processor, the memory storing instructions which when executed by the processor, cause the processing system to perform a process comprising:
      setting a first database into a quiesced state, wherein the first database is maintained in a file system of a storage server, wherein the first database has an identifier uniquely identifying the first database;
      creating a second database by creating a writeable persistent point-in-time image (WPPI) of the first database, wherein the WPPI includes a reference to at least part of the first database but does not duplicate said part of the first database when the WPPI is created; and
      modifying the first database or the second database such that the identifiers of the first and second databases are different within a database name space; and
      storing the first database and the second database within the same domain.

20. The processing system of claim 19, wherein the quiesced state comprises an offline state.

21. The processing system of claim 19, wherein the quiesced state comprises a hot-backup state.

22. The processing system of claim 19, wherein the file system comprises a write out-of-place file system.

23. The processing system of claim 19, wherein the database name space is defined as a Host or a Database Server.

* * * * *